Patented Oct. 9, 1923.

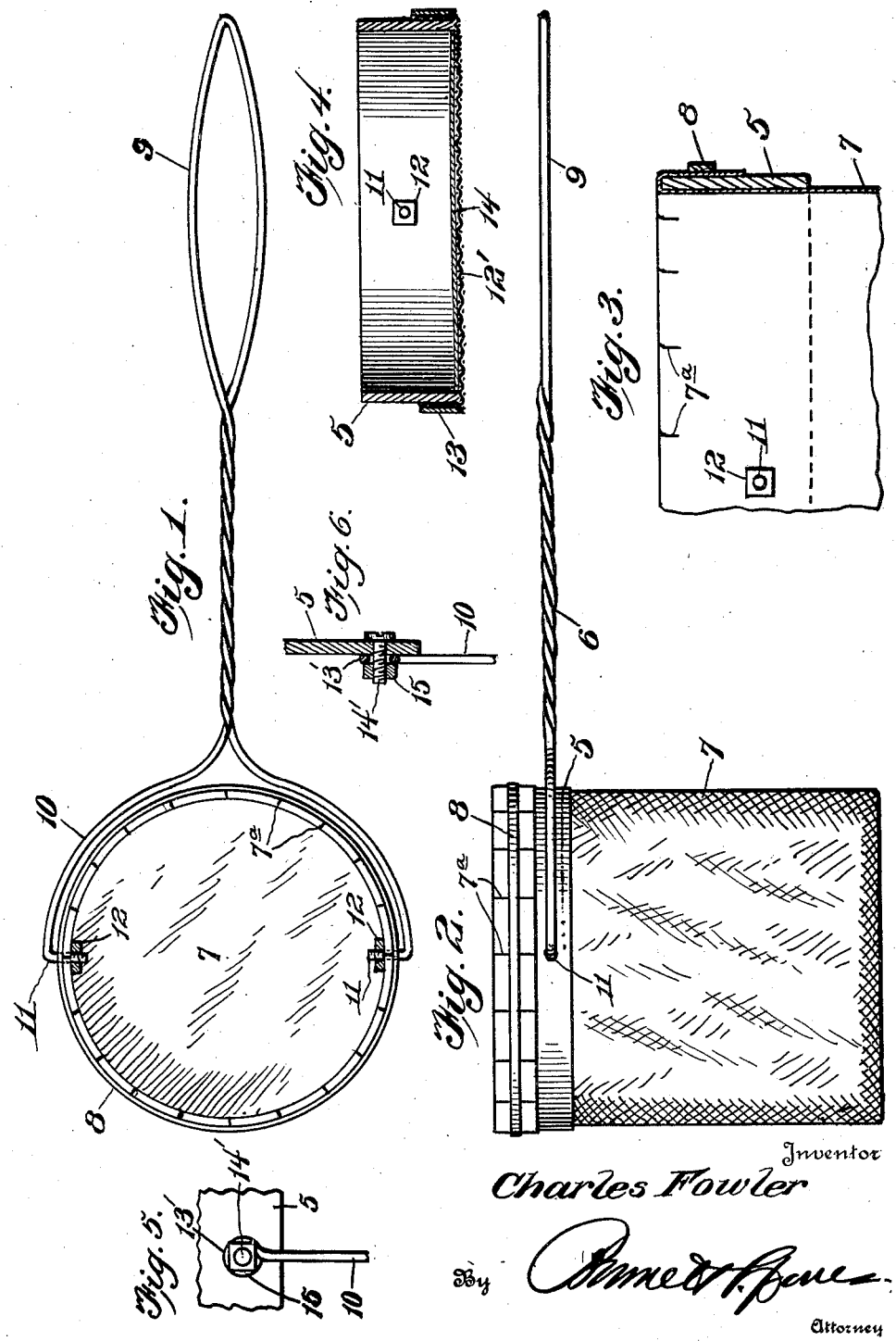

1,470,435

UNITED STATES PATENT OFFICE.

CHARLES FOWLER, OF TOMKINS COVE, NEW YORK.

INSECT CATCHER.

Application filed April 7, 1922. Serial No. 550,403.

*To all whom it may concern:*

Be it known that I, CHARLES FOWLER, a citizen of the United States, residing at Tomkins Cove, in the county of Rockland and State of New York, have invented new and useful Improvements in Insect Catchers, of which the following is a specification.

It is well known that in localities infested with flying insects, such as the common house fly, mosquitoes, gnats and the like, it is practically impossible to keep such insects from gaining access to houses. In the case of full grown insects of this kind, fine mesh screening has been found partly effective in precluding entrance of such insects to the buildings. However, such preventatives or obstructions are of no avail in preventing young or under size insects from entering the building. These smaller or undeveloped insects pass with ease through the mesh fabric and around the edges of screens and the like, and when upon the interior of the building assume full grown proportions. To rid a room or building of such insects, several devices have been employed with indifferent success, and a very common and practical way of eliminating these pests is by killing them with the familiar fly swatter or other implement. In this operation, the wall-paper or surface upon which the insect is killed frequently becomes besmeared and rendered unsightly, and the advantageous results secured by eliminating the insects are thus out-weighed by the damage sustained by the room or house decorations.

The primary object of the invention is to provide means of a simple and improved nature for exterminating insects thus entrapped in a room or building without danger or likelihood of a wall or other surface upon which the insect reposes being soiled or rendered unsightly.

A further object of the invention is to provide means of the character and for the purpose stated by the use of which the insects may be very effectively entrapped and held positively against escape, and wherein the same may collectively be destroyed in an easy and simple manner at a proper time.

The invention consists of the features of construction, combination and arrangement of parts, hereinafter fully described and claimed, reference being had to the accompanying drawing, in which:—

Figure 1 is a top view of an insect catcher constructed in accordance with the invention, Figure 2 is a side elevation of the improved catcher, Figure 3 is an enlarged fragmentary sectional view taken through a portion of the catcher, Figure 4 is a detail sectional view taken through the catcher body and illustrating a slightly modified form of the invention, Figure 5 is a fragmentary side elevation of the ring, showing a modified means of fastening the yoke arms thereto, and Figure 6 is a sectional view of the same.

The device of my invention includes a readily manipulated trap or catcher adapted to be quickly moved over an insect, so as not to engage or kill the insect, but which so effectively entraps the insect as to cause it to fly or pass into the catcher portion of the device. This catcher portion of the device includes a sack or receptacle having an adhesive or sticky surface with which the insect must come in contact, thereby causing the insect to be firmly held within the sack. After the device has been used to such extent that an appreciable number of such insects have been thus entrapped, the sack portion or adhesive surface may be removed from the body and burned or in other ways destroyed.

More particularly, the body includes a ring or rim 5 formed of any suitable material, preferably of paper, cardboard, or other light, thin and inexpensive material, of any suitable diameter. This ring may be comparatively shallow, and will possess sufficient rigidity and strength to withstand the strains and blows to which the device will be subjected in use. This ring is attached to the outer end of a handle 6, in order that the same may be easily and accurately moved and controlled when in the grasp of an operator.

In one embodiment of the invention a sack 7 is employed; this sack having its open end attached firmly to the ring 5, and being coated upon its inner surfaces with a suitable adhesive. The sack may be of any desired depth, and may be made of any preferred material, paper being deemed most practical. Obviously, the diameter of the sack must be substantially equal to the diameter of the ring 5, or slightly less, and in practice the open end of the sack is inserted in the ring and the edges thereof bent or shaped about one edge of the ring and are secured tightly against the exterior surface of the said ring in any suitable manner, an elastic or other suitable band 8 being employed in the present instance for this purpose. The sack or bag 7 will possess sufficient rigidity to prevent it collapsing during movements of the implement through the air. As shown in the present instance, the open end of the sack is inserted through the ring 5 and its free edge bent backward over the outer surface of the ring in the form of a flange engaged by the band 8. This flange may be formed of strips or tabs separated from each other by longitudinal slits 7ª, such structure allowing the tabs of the flange to be so disposed as to adapt the flange to snugly embrace the exterior of the ring.

In order that the ring or body 8 may conform to an irregularity in a wall or other surface with which it is brought in contact, and to compensate for differences in the angle between the surface to be contacted and the handle 6, the ring is pivotally carried by the outer end of the said handle. The handle may be formed of any suitable material or combination of materials. In the present instance it is shown composed of a strand of wire twisted in that part to which the greatest amount of strain must be assumed, formed intermediate its ends with a broadened or looped portion 9 to constitute a hand grip, and having its ends bent outwardly as at 10 to form a yoke to embrace or engage around the ring 5. The extremities of the arms of this yoke are bent inwardly in the form of trunnions 11 which are passed through suitable openings at diametrically opposite points in the ring 5 and also through the walls of the sack 7, said trunnions thus also serving as retaining pins to assist in holding the sack in position and to prevent displacement of the sack in the event of casual displacement of band 8. If desired, the trunnion pins 11 may be threaded to receive nuts 12 bearing against the inner walls of the ring. These nuts may be adjusted to bear with greater or less friction against the inner face of the ring to control the pivotal movement of the catcher device on the yoke arms 10 of the handle, and they also serve to prevent casual disconnection of the receptacle from the yoke arms. By adjusting these nuts a binding pressure between the ring and yoke arms may be instituted, to prevent the catcher receptacle from turning too freely or loosely on the yoke arms, or for fixing it in adjusted position on the yoke arms, so
that it may be disposed at any working an-
gle. By this means casual movement of the receptacle out of a proper and determined working angle may be avoided, and any tendency to looseness between the parts prevented, which would otherwise cause the receptacle to wobble, or turn too freely on the yoke arms, with the result of impairing its efficiency.

In the modified form shown in Figure 4, the ring 5 has one end covered by a fabric 12', this fabric being held properly over the said end by the band 13. This fabric 12' supports a disk or sheet of paper or other material 14 having a coating of adhesive on its inner surface. The disk 14 may be of a diameter substantially equal to or a trifle greater than the interior diameter of the ring 5, so that the edges of the sheet will contact and bind against the walls of the ring 5 with sufficient pressure to maintain the disk properly positioned within the ring.

In operating the device, the adhesive-coated sack shown in Figures 1, 2 and 3 of the drawing is applied to the ring in the manner shown. When it is desired to entrap an insect, the device is manipulated to dispose the trap receptacle over a fly located on a wall, table or other surface; the open end of the ring 5 being made to encompass the insect. The latter immediately attempts to escape by flying, and as there is but one direction for it to travel, it must come into contact with the sticky inner lining of the sack, and will therefore be held securely against escape. After a sufficient number of the insects have thus been caught, the sack may be removed and burned or buried, and a new sack applied to the holder. The device shown in Figure 4 is similarly operated, and when the adhesive-coated disk 14 contains a sufficient quantity of entrapped insects, the same may be readily removed from the interior of the ring and destroyed.

In the form of my invention shown in Figures 5 and 6, the trunnion pins 11 are dispensed with, and the free ends of the yoke arms 10 are arranged to lie on the outer side of the ring and are formed into eyes 13'. Bolts 14', having headed inner ends to lie against the inner wall of the ring, are provided for passage through the ring and eyes 13', and fitted on these bolts are retaining nuts 15, which hold the yoke eyes from displacement. These nuts may be tightened up to regulate the pressure of the yoke arms and the pivotal movement of the ring thereon, and to fix the ring against movement at any working angle with relation to the yoke arms and handle, the advantages of which will be evident from the foregoing description.

While the above is a description of the invention in its preferred form, it will be understood that various changes in the construction and arrangement of parts may be resorted to if desired, without departing from the spirit of the invention as defined by the claims.

Having thus fully described my invention, I claim:—

1. In an insect catcher, a ring, a sack having its open end of substantially equal diameter with said ring, the said sack having its open end inserted in said ring and the extremities of the said end bent over to form a flange encircling the exterior surface of said ring, and a band embracing said flange to clamp the same to said ring.

2. In an insect catcher, a ring, means carried by said ring for entrapping an insect, a handle having yoke arms pivotally engaging the ring, and binding means associated with said yoke arms for fixing the ring to or regulating its pivotal movement on the yoke arms.

3. An insect catcher comprising a ring, a handle having yoke arms pivotally connected with the ring, binding means associated with said yoke arms for fixing the ring to or regulating its pivotal movement on the yoke arms, and a sack carried by the ring and provided with an adhesive coating.

4. An insect catcher comprising a ring, a handle having yoke arms, means pivotally connecting said yoke arms with the ring, binding means associated with said connecting means for fixing the ring to the yoke arms or regulating its pivotal movement thereon, and a catcher sack carried by the ring and having an adhesive coating.

5. An insect catcher comprising a ring, a sack having a coating of adhesive material, said sack being passed at its open end through the ring and having its free edge turned back upon the outside of the ring, a fastening band applied to the ring and overlying said free edge, and a handle for manipulating the device.

In testimony whereof I affix my signature.

CHARLES FOWLER.